US012709269B2

(12) United States Patent
Münning et al.

(10) Patent No.: US 12,709,269 B2
(45) Date of Patent: Aug. 18, 2026

(54) METHOD FOR CHECKING THE PLAUSIBILITY OF AT LEAST ONE PORTION OF A DRIVING TRAJECTORY FOR A VEHICLE

(71) Applicants: CARIAD SE, Wolfsburg (DE); Volkswagen Aktiengesellschaft, Wolfsburg (DE)

(72) Inventors: Daniel Münning, Braunschweig (DE); Ferdinand Farenholtz, Berlin (DE); Thomas Strehlow, Braunschweig (DE); Michael Stark, Berlin (DE)

(73) Assignees: Cariad SE, Wolfsburg (DE); Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 18/708,968

(22) PCT Filed: Oct. 6, 2022

(86) PCT No.: PCT/EP2022/077760
§ 371 (c)(1),
(2) Date: May 9, 2024

(87) PCT Pub. No.: WO2023/083531
PCT Pub. Date: May 19, 2023

(65) Prior Publication Data

US 2025/0033635 A1 Jan. 30, 2025

(30) Foreign Application Priority Data

Nov. 10, 2021 (DE) ......................... 102021129258.1

(51) Int. Cl.

| | |
|---|---|
| ***B60W 30/12*** | (2020.01) |
| ***B60W 50/14*** | (2020.01) |
| ***G06V 20/56*** | (2022.01) |

(52) U.S. Cl.
CPC ............ *B60W 30/12* (2013.01); *B60W 50/14* (2013.01); *G06V 20/588* (2022.01);
(Continued)

(58) Field of Classification Search
CPC ................. B60W 30/12; B60W 50/14; B60W 2420/403; B60W 2520/10;
(Continued)

(56) References Cited

U.S. PATENT DOCUMENTS

| | | | |
|---|---|---|---|
| 8,996,197 | B2 | 3/2015 | Joh et al. |
| 10,814,872 | B2 | 10/2020 | Sofra et al. |

(Continued)

FOREIGN PATENT DOCUMENTS

| | | | |
|---|---|---|---|
| DE | 10349631 | A1 | 5/2005 |
| DE | 102014211450 | A1 | 12/2014 |

(Continued)

*Primary Examiner* — Joseph J Dallo
(74) *Attorney, Agent, or Firm* — Seed Intellectual Property Law Group LLP

(57) ABSTRACT

The disclosure relates to a method for checking plausibility of at least one portion of a driving trajectory for a vehicle. First, the portion of the driving trajectory is provided by way of a storage unit external to the vehicle based on swarm data. For a roadway of the vehicle, at least one segment of a roadway boundary is sensed by way of a sensing unit of the vehicle during the operation of the vehicle. The at least one portion the driving trajectory is compared with the at least one segment of the roadway boundary based on a first plausibility condition. The at least one first marking portion is compared with the at least one segment of the roadway boundary based on a second plausibility condition. The plausibility of the at least one portion is checked in accordance with the comparisons.

8 Claims, 7 Drawing Sheets

(52) U.S. Cl.
CPC ... *B60W 2420/403* (2013.01); *B60W 2520/10* (2013.01); *B60W 2552/53* (2020.02); *B60W 2556/20* (2020.02)

(58) Field of Classification Search
CPC ......... B60W 2552/53; B60W 2556/20; B60W 2554/4042; B60W 2556/05; B60W 2556/10; B60W 2556/45; G06V 20/588
See application file for complete search history.

(56) References Cited

U.S. PATENT DOCUMENTS

| | | | | |
|---|---|---|---|---|
| 11,591,015 | B2 * | 2/2023 | Eilers | B62D 15/0235 |
| 12,214,786 | B2 * | 2/2025 | Rohlfs | G06V 20/588 |
| 2008/0291276 | A1 | 11/2008 | Randler | |
| 2020/0110422 | A1 | 4/2020 | Takamatsu et al. | |
| 2020/0363218 | A1 | 11/2020 | Kim | |
| 2023/0103020 | A1 * | 3/2023 | Rohlfs | G06V 20/588 701/23 |
| 2025/0033635 | A1 * | 1/2025 | Münning | B60W 50/14 |

FOREIGN PATENT DOCUMENTS

| | | | | |
|---|---|---|---|---|
| DE | 102015014651 | A1 | 5/2017 | |
| DE | 102019004833 | A1 | 1/2020 | |
| DE | 102020202163 | A1 | 8/2021 | |
| DE | 102021129258 | A1 * | 5/2023 | B60W 50/14 |
| EP | 3462134 | A1 | 4/2019 | |
| WO | 2011/131165 | A1 | 10/2011 | |
| WO | WO-2020104076 | A1 * | 5/2020 | B60W 30/12 |
| WO | WO-2020104245 | A1 * | 5/2020 | B60W 30/18072 |
| WO | 2021/043507 | A1 | 3/2021 | |
| WO | WO-2022235973 | A1 * | 11/2022 | H04W 4/40 |
| WO | WO-2023066864 | A1 * | 4/2023 | B60W 50/045 |
| WO | WO-2023066906 | A1 * | 4/2023 | B60W 60/001 |
| WO | WO-2023083531 | A1 * | 5/2023 | B60W 50/14 |

* cited by examiner

METHOD FOR CHECKING THE PLAUSIBILITY OF AT LEAST ONE PORTION OF A DRIVING TRAJECTORY FOR A VEHICLE

BACKGROUND

Technical Field

The disclosure relates to a method for checking the plausibility of at least one portion of a driving trajectory for a vehicle. The disclosure also relates to a method for operating a vehicle with a driver assistance system, to a driver assistance system, which comprises a control unit, as well as to a motor vehicle with a driver assistance system.

Description of the Related Art

Many driver assistance systems are based on the fact that a lane recognition is effected by way of camera data. If lanes are not recognizable, the driver assistance system possibly cannot be provided. Since many vehicles sense environmental data in the meantime and they generate it in the form of swarm data for other vehicles, the possibility arises to be able to use swarm data for driver assistance systems.

Thus, WO 2011/131165 A1 for example shows a method for determining a roadway course for a motor vehicle. With the aid of generated sensor data relating to the roadway, a lane model parameter for the roadway can be generated. Structures parallel to roadway of at least one range area are detected in the sensor data. A tangential direction of at least the one structure parallel to roadway is determined. For determining the lane model parameter, a value of the tangential direction of the structure parallel to roadway is adopted as a value for the tangent direction in the point of contact with the structure parallel to roadway by way of a predictive estimation method.

Embodiments of the disclosure provide a method, which enables the examination of a credibility of provided swarm data external to vehicle for a vehicle function.

BRIEF SUMMARY

A first aspect of the disclosure provides a method for checking the plausibility of at least one portion of a driving trajectory for a vehicle. The vehicle can be formed as a motor vehicle, automobile, motorcycle or truck. The at least one portion of the driving trajectory and a first marking portion of a lane marking, roadway marking and/or roadway boundary marking can be provided based on swarm data by a storage unit. The portion and the marking portion in particular relate to the driving trajectory and to the lane marking, respectively. The first marking portion can be considered as a left-side or right-side marking portion. The roadway boundary can represent a boundary of a road. For example, a transition from asphalt to grass or gravel can be considered as a roadway boundary. A rural road without markings still can comprise a marking portion. The roadway boundary can be realized by way of a curb or another constructional separation of the road from its surroundings The storage unit can be arranged in the vehicle, it can also be an external storage unit. The swarm data can be provided on an internal storage unit of the vehicle in advance. The swarm data can in particular be collected environmental data of other vehicles, in particular of a vehicle fleet. The swarm data can be recorded on the storage unit. This collected information can relate to the driving trajectory, which represents a route of the vehicle. Besides the driving trajectory, the swarm data can also include further collected information related to the roadway, a roadway boundary or a roadway lane. The swarm data can be regarded as fleet data. In particular, an average value for the driving trajectory can respectively be formed from multiple trajectories, which are provided by multiple different vehicles. Thus, the driving trajectory can in particular represent an average value of multiple individual trajectories based on the swarm data, wherein each individual trajectory is provided by a respective vehicle. The same can apply to a left or right roadway boundary. The roadway boundary can be formed as a lateral roadway marking or as a central lane marking.

In a further step, at least one segment of a roadway boundary for a roadway of the vehicle can in particular be sensed by way of a sensing unit of the vehicle in operating the vehicle. The at least one segment is in particular sensed if the vehicle moves on the roadway. The at least one segment of the roadway boundary preferably relates to a marking of the roadway or to a boundary of the roadway. Thus, the roadway boundary can be formed as a left or right roadway marking, left or right lane marking. A first roadway marking preferably corresponds to the left roadway marking. A second roadway boundary preferably corresponds to the right roadway boundary. The sensing unit of the vehicle can in particular be formed as a front camera, radar sensor, ultrasonic sensor.

In a further step, the at least one portion of the driving trajectory can be compared to the at least one segment of the roadway boundary based on a first plausibility condition. In particular, the first plausibility condition includes different comparisons to determine to what extent the portion of the driving trajectory is parallel to the segment of the roadway boundary and if these two elements are spaced from each other in a preset interval.

For the first plausibility condition, at least one distance, in particular a single distance, or else multiple, in particular at least two, different distances of the at least one portion to the at least one segment can in particular be compared to at least one threshold value. Additionally or instead thereof, an angle between the at least one portion and the at least one segment can be compared to an angle threshold value. At least one angle between the portion of the driving trajectory and the segment of the roadway boundary can be determined on at least one location and evaluated. Thus, two different comparisons relating to the portion and the segment can be performed within the scope of the first plausibility condition.

Similarly, multiple portions can be compared to multiple segments. Therein, exactly one portion is preferably compared to exactly one segment. The segment, which is compared to the respective portion, can in particular be positioned from the portion along a transverse direction of the vehicle. In particular, the segments as well as the portions can be formed as linear portions and linear segments. The linear segments and linear portions can each be defined by exactly two points. These points can be regarded as supporting points. Thus, an individual linear segment can be defined by way of a first supporting point and a second supporting point. Correspondingly, a respective linear portion can be defined based on a first as well as second supporting point. Preferably, respective first supporting points of the segment and of the portion can be arranged along a transverse direction of the vehicle. Similarly, the respective second supporting points can be arranged opposing along the transverse direction of the vehicle. To put it simply, a respective portion is arranged laterally next to the respective segment. Here, laterally in particular has the meaning of the transverse direction of the vehicle.

In the comparisons, multiple distances can be compared to multiple threshold values. For example, a second distance value can be generated based on the two second supporting points and a first distance value can be generated based on the two first supporting points. These two distance values can be compared to the threshold value or other threshold values. In particular, the threshold value can be dependent on a type of the roadway and/or on a traffic situation.

In a further step, the at least one first marking portion can be compared to the at least one segment of the roadway boundary based on a second plausibility condition. Here, it can in particular be examined if the segment of the roadway boundary, which is sensed by sensor data, is substantially parallel to the marking portion. A deviation of up to 4° can still be assessed as "parallel". At the same time, it can be examined if the first marking portion from the swarm data is arranged in surroundings of the segment of the roadway boundary. Hereto, a comparison of a distance of these two elements to a stripe distance can be effected. With respect to the angle, an angle of these two elements can be compared to a lane angle.

In a further step, the at least one portion can be checked for plausibility depending on the comparisons. In particular, the plausibility check can include multiple comparisons or multiple comparison processes. Therein, it can be provided that each comparison has to satisfy at least the first and the second plausibility condition. Further additional conditions or criteria can be taken into account for a more detailed plausibility check. For example, it can be provided that preset threshold values have to be exceeded or undershot in order that the respective comparison can be taken into account for the plausibility check. If a preset criterion is not satisfied, since a respective threshold value is not exceeded or undershot as preset, thus, it can be provided that a plausibility check cannot be effected. Thus, the method for plausibility check based on a number of comparisons or number of criteria can influence a quality of the plausibility check process or of the method.

In particular, it can be checked for plausibility if the distance or multiple distances of the at least one portion of the driving trajectory to the at least one segment of the roadway boundary are less than the threshold value and the angle thereof is less than the angle threshold value at the same time.

In particular, the plausibility check is to be an analysis, by which it is examined if at least one portion of the trajectory can match the roadway or how confidential the swarm data is in the light of the sensor data (segments). In particular, it is examined if the positions and/or orientations and/or courses of the portion and of the roadway marking match such that a safe movement of the vehicle along the driving trajectory on the roadway portion is allowed.

It is possible to freely parameterize the respective threshold values for the comparison. Thus, the respective threshold values or angle values can be dependent on a speed of the vehicle, a roadway property, a type of the roadway and/or dependent on a preset traffic situation. Similarly, extended dependencies such as for example current weather information can be taken into account for the vehicle with respect to the threshold values.

Additionally or alternatively, a further embodiment can provide that a distance or multiple distances of the at least one portion of the driving trajectory to the at least one segment of the roadway boundary are compared to a threshold value and an angle between the at least one portion of the driving trajectory and the at least one segment is compared to an angle threshold value for the first plausibility condition. In particular, the first plausibility condition includes two different comparisons. The first comparison relates to the distance of the at least one portion of the driving trajectory to the at least one segment of the roadway boundary to a threshold value. The second comparison of the first plausibility condition relates to the angle between the at least one portion of the driving trajectory and the at least one segment, which is compared to the angle threshold value.

Alternatively or additionally, a stripe angle between the at least one segment and the at least one first marking portion can be compared to a lane angle and a stripe distance given by the at least one marking portion and the at least one segment of the roadway boundary can be compared to a lane distance for the second plausibility condition. In particular, the second plausibility condition also includes two comparisons, which differ from the comparisons with respect to the first plausibility condition. A first comparison of the second plausibility condition in particular relates to a stripe distance given by the at least one marking portion and the at least one segment of the roadway boundary, which is compared to the lane distance. The lane angle and the lane distance in particular represent respective threshold values for the comparisons of the second plausibility condition.

Additionally or alternatively, a further embodiment can provide that multiple portions of the driving trajectory and of the first marking portion and multiple segments are respectively provided and each segment is associated with exactly that portion for the respective comparison, which is positioned along a transverse direction of the vehicle starting from the respective segment. Preferably, the respective first supporting points of the portions and of the segments are defined and/or arranged along the transverse direction of the vehicle. The same can apply to the second supporting points. Thus, exactly one single segment of the respective roadway boundary can be arranged next to a certain portion of the driving trajectory. The same can apply to the marking portion and the segment. In particular, a 1-1 relation (bijective) can be present between the respective portions and the associated segments of a certain roadway boundary. This bijective relation preferably applies to the portions and a roadway boundary. At the same time, the same bijective relation can additionally apply between the portions and a further additional roadway boundary.

In particular, the portions can be linearly formed and the segments can also be linearly formed. The linear portions can be extracted and/or conditioned from the swarm data. This can apply both to the driving trajectory and to other elements of the roadway. For example, multiple linear portions can be extracted and/or conditioned from the swarm data with respect to a first or second lane marking. The same can be the case with respect to the segments for a first or second roadway boundary. Thus, arbitrarily many different roadway boundaries can be extracted and/or conditioned from the swarm data in principle.

The swarm data can for example be present in spline form, while the data of the sensing unit or of the camera is present in the form of clothoids. A spline is in particular a function, which is composed of polynomials in pieces. An n-th degree spline is in particular a polynomial of at most n-th degree. The n-th degree spline is preferably n−1 times continuously differentiable. Preferably, the degree n indicates the highest power in the polynomial. A clothoid can in particular be a third order polynomial (n=3), wherein this polynomial does not have a point of inflection. Thus, information relating to the driving trajectory can be present in the form of a spline on the external storage unit. Upon providing the at least one portion of the driving trajectory, the spline form can be converted into a linear portion for the driving trajectory by way of a corresponding computing unit. Thus, information of the swarm data can be extracted and/or conditioned.

A further embodiment can provide that the segments and portions are each defined based on a first supporting point and a second supporting point. Respectively associated segments and portions can in particular have the same sense along a preset vehicle direction, and each two distance values based on the supporting points respectively associated in transverse direction can be used for the respective comparison for the first and/or second plausibility condition.

Alternatively, the distance values can be compared to two further different threshold values. For example, the distance values can be compared to a coarse threshold value and to a fine threshold value. The fine threshold value is preferably used if a high degree of plausibility check is desired. In contrast, if only an approximate plausibility check is sufficient, thus, the coarse threshold value can be used for the comparison instead of the fine threshold value. With respect to all of the threshold values, it is possible to employ threshold values adapted to situation. Preferably, it is distinguished between "coarse" threshold values and "fine" threshold values. Usually, the coarse threshold value is greater than the fine threshold value, thus allows a slightly greater deviation of the swarm data from the sensor data (camera), which provides the segments.

The first and second supporting points of the segments or portions can be regarded as start and end points of the segments or portions. This preferably applies to the linear segments and linear portions. In particular, an initial spacing can be ascertained with respect to all of the embodiments of this application. In particular, the initial spacing can be ascertained based on the first segment and the first portion in a sequence of segments and portions. The first segment of multiple segments (the very first segment) and the first portion (the very first portion) of multiple portions can be construed as initial segment or initial portion. Thus, the initial segment can be regarded as the very first segment. The same can apply to the initial portion. The respectively first supporting points of the initial segment and of the initial portion result in the initial spacing with respect to their spacing in transverse direction. The respective distance values of the following segments and portions, which result based on the respective first supporting points or second supporting points, can be transferred into two distance difference values with the aid of the initial spacing. For example, this can be effected by forming a difference of a respective distance value with the initial spacing. In the step of the comparison, the respective distance difference value can be compared to the threshold value, the fine threshold value and/or coarse threshold value, instead of the distance.

Thus, it is possible that the respective distance difference values are employed for the comparison to the differently mentioned threshold values or angle threshold values instead of the distance in all of the embodiments. Thereby, it is possible to individually adapt the step of comparison to a respective traffic situation and thus to allow an appropriate plausibility check.

An additional or alternative embodiment can provide that the multiple segments and the associated portions are indexed. Indexing can in particular mean that a number or digit is assigned to each segment. Therein, a number of digit greater by 1 is preferably in particular assigned to immediately consecutive segments or portions than to the immediately preceding portion or segment. Preferably, the multiple segments are numbered in ascending manner with the aid of natural numbers. Therein, the multiple segments and/or the associated portions can be differently long with respect to their extension in direction of travel (lane). The segments and portions can have an extension along the direction of travel as well as an extension along the transverse direction to the vehicle. With respect to the extension along the direction of travel, the segments and the portions associated with them are each identically long or have the same extension.

Each segment-portion pair can be associated with one of multiple spacing ranges preset in vehicle direction. The spacing ranges can for example be divided into a near range, middle range and wide range. This division can be effected depending on the indexing. Thus, a digit associated with the segment or portion can for example be associated with a respective spacing range. Thereto, respective limit values can be correspondingly provided for the different spacing ranges. For comparing, a separate threshold value for the distance or the distance difference value as well as a separate angle threshold value for the angle can in particular be defined for each spacing range. Tendentially, a spacing in direction of travel increases with increasing indexing or digit. For example, a $75^{th}$ segment in direction of travel is located farther away from the vehicle than a fifth segment. The fifth segment can for example be two meters away from the vehicle, while the $75^{th}$ segment is 300 meters away from the vehicle in vehicle direction. According to required degree of the plausibility check, the coarse threshold value or the fine threshold value can respectively be used in comparing. In particular, segments and portions respectively associated with each other are provided with the same index or the same digit. Preferably, these portions associated with each other are arranged along the transverse direction of the vehicle. Thus, exactly those portions are preferably associated with those segments, which are situated or located laterally in transverse direction of the vehicle. By way of the indexing, the association of the segments with the portions can be facilitated or be more easily comprehensible. Thus, it can be ensured that the correct segments and the related associated portions are always used within the scope of the comparison.

An additional or alternative embodiment can provide that the first marking portion is provided for a lane marking, roadway marking and/or roadway boundary marking by way of the swarm data. Similarly, a second marking portion can be provided for a lane marking in addition to the first marking portion. For example, it can be a right and left roadway boundary. Preferably, the first and/or a second marking portion are linear. In this embodiment, multiple linear marking portions are preferably provided for a single lane marking, roadway marking or roadway boundary marking.

For example, the lane marking can be a line applied to the roadway in dashed manner, which constitutes a boundary to an adjoining lane. A roadway marking can be a solid line applied to the roadway, which represents a roadway boundary. A roadway boundary can result based on different surface property of the roadway, elevations like a curbside and/or depressions like an open drainage channel. Information relating to such lanes, roadways and/or roadway boundaries can be provided, extracted and/or conditioned by the swarm data. Therein, the raw data of the swarm data, which is often present in spline form, can be transferred into linear marking portions by a corresponding conditioning.

In this embodiment, it is preferably additionally examined within the scope of the first plausibility condition if a side distance of the at least one portion of the driving trajectory to the at least one segment of the roadway boundary is within a width interval. In particular, the width interval can have a half vehicle width as the lower value and the width interval can have a lane width of a roadway lane of the vehicle as the upper value. The vehicle width can be approximately 2 meters. Thus, it can be examined if the linear marking portions belong to a lane, which can be associated with the driving trajectory. Thus, it can for example be ascertained whether or not a corresponding roadway marking or lane marking belongs to the driving trajectory in multi-lane roads such as for example on a highway.

Furthermore, the stripe angle between the at least one segment of the roadway boundary and the at least one first marking portion can be compared to the lane angle in this embodiment. Depending on whether this angle is greater or less than the lane angle, this comparison can be positively or negatively assessed. In addition, a stripe distance given by the at least one first marking portion and the at least one segment of the roadway boundary can be compared to the lane distance.

The stripe distance in particular results based on an offset between the respective first or second marking portion and the respective segment of the roadway boundary. Thus, the stripe distance preferably indicates to what extent the swarm data deviates from the associated camera data with respect to the roadway boundary. In particular, the stripe angle indicates to what extent the respective first or second marking portion is rotated or tilted to the respective segment of the roadway boundary. The stripe angle can indicate to what extent the respective marking portion and the respective segment of the roadway boundary are parallel to each other.

Preferably, the plausibility check is effected depending on the examination and the comparisons. Therein, the first and the second plausibility conditions are preferably taken into account. This in particular means that the respective plausibility condition is considered as satisfied only if the associated threshold value is not exceeded or the respective comparison variables remain below the associated threshold value in the respective comparison. In particular, it is examined if the stripe angle is less than the lane angle, if the side distance of the marking portion to the segment of the driving trajectory is within the width interval and if the stripe distance is less than the lane distance. Preferably, the plausibility check is effected only if these conditions are satisfied. The comparisons with respect to the side distance, the stripe distance and the stripe angle can respectively be regarded as criteria for the respective plausibility condition and thus for the plausibility check. In particular, it can be provided that all of the criteria are to be satisfied for a respective embodiment to allow a plausibility check and thus an approval of the swarm data.

This embodiment can be developed with the aid of a case differentiation. With respect to both cases, the respective distance differences are preferably ascertained from the initial spacing. These respective distance differences can be employed instead of or in addition to the distance of the respective portion of the driving trajectory to the respective segment of the roadway boundary. If the distance difference values are employed, thus, the coarse threshold value or the fine threshold value will be employed according to case differentiation. Therein, a lateral distance value can in particular be ascertained. In particular, the lateral distance value can be ascertained based on the respective portion of the driving trajectory to the associated respective segment of the roadway boundary. For calculating the lateral distance value, the respectively associated first supporting points or second supporting points of the segments or portions can be used. In particular, the lateral distance value can be and mean the same as the side distance. In case of a lateral distance value or side distance, which is less than a lateral limit value, the coarse threshold value is preferably used for comparing the respective distance difference values. In case of a lateral distance value greater than the lateral limit value, the fine threshold value is preferably used for comparing the distance difference values. Thus, it is decided based on the lateral distance value if the coarse or the fine threshold value is employed in comparing the distance difference values.

In addition, it can be provided in this embodiment that the side distance of the at least one segment of the roadway boundary to the corresponding marking portion is ascertained and this side distance is compared to the lower value of the width interval. The lower value of the width interval can in particular indicate how much the linear marking portion is allowed to deviate from the at least one segment of the roadway boundary. Thus, this embodiment can be supplemented by way of multiple additional comparisons. Therein, each comparison represents a criterion or a condition for the plausibility check. In particular, it can be provided that all of the conditions or all of the criteria have to be satisfied in order that a plausibility check can be effected. Thus, it can be additionally verified if the swarm data coincides with the segments of the roadway boundary with respect to the marking portions or if the swarm data is confidential or plausible in view of the data of the camera. At the same time, it can be examined based on the examination of the distance of the marking portions to the segments of the driving trajectory if the vehicle travels on a lane, which belongs to the lane marking according to the associated segments.

An additional or alternative embodiment can provide that at least a first linear marking portion is provided for a lane marking, roadway marking and/or roadway boundary marking by way of the swarm data. In addition, it can be provided that at least a second linear marking portion is provided for a second roadway marking by way of the swarm data. For the first and/or second roadway marking, multiple marking portions can be respectively correspondingly provided. By way of the sensing unit, at least one segment for a first and a second roadway boundary for the roadway of the vehicle can respectively be sensed. Thus, two roadway boundaries are preferably sensed for the roadway of the vehicle. For these two roadway boundaries, multiple linear segments can be correspondingly respectively acquired from the swarm data. Preferably, these two roadway boundaries are positioned laterally to the left and right from the vehicle.

By the sensing unit, at least one segment for the first and a second roadway boundary for the roadway of the vehicle can respectively be sensed. Two different roadway boundaries or lane markings can be sensed by the camera as the sensing unit. They can be a right roadway marking of a lane and a left roadway marking of a lane. Alternatively, a type of “road edge” in the form of a curb, a transition from asphalt to gravel or unpaved terrain or the like can be sensed.

For the first plausibility condition, it is in particular examined if a first side distance of the at least one portion of the driving trajectory to the at least one segment of the first roadway boundary and a second side distance of the at least one portion of the driving trajectory to the at least one segment of the second roadway boundary each exceed a preset width value.

According to this embodiment, it can be examined if the first side distance of the at least one portion of the driving trajectory to the at least one segment of the first roadway boundary and the second side distance of the at least one portion of the driving trajectory to the at least one segment of the second roadway boundary each exceed the preset width value. The preset width value can in particular be a half vehicle width of the vehicle.

In addition, it can be provided in this embodiment that it is examined if the stripe angle between the at least one first segment and the at least one first marking portion exceeds the lane angle. Thereto, the stripe angle can be compared to the lane angle. In addition, it can be examined if a stripe distance given by the at least one marking portion exceeds a lane distance. Thereto, the stripe distance can be compared to the lane distance.

Preferably, the plausibility check is effected based on these examinations and the associated comparisons. The plausibility check is preferably only effected if the stripe angle falls below the lane angle, the stripe distance falls below the lane distance and the respective side distances of the driving trajectory to the respective segments of the markings exceed the preset width value. The comparisons with respect to the side distance, the stripe distance and the stripe angle can each be regarded as criteria for the second plausibility condition. In particular, it can be provided that all of the criteria are to be satisfied for a respective embodiment, to allow a plausibility check and thus an approval of the swarm data.

In addition, this embodiment can provide further examinations or further comparisons. The first and/or second plausibility condition can be extended. If sensor data and swarm data is for example present with respect to a roadway marking, thus, the coarse threshold value is used in comparing with respect to the plausibility check of the at least one portion of the driving trajectory. Within the scope of this comparison, the distance difference values can be ascertained from the initial spacing. If both sensor data and swarm data are present relating to a lane, the coarse threshold value can in particular be used as a standard of comparison in the corresponding comparison of the distance of the at least one portion of the driving trajectory to the at least one segment of the corresponding roadway boundary or marking. In this case, it is sufficient for the plausibility check if the respective distance difference values fall below the coarse threshold value.

In case that sensor data is present with respect to two roadway markings, thus segments for the first and second roadway boundary are sensed by the sensing unit, the fine threshold value can be used in comparing the distance difference values. The fine threshold value is preferably used if associated swarm data is not present to a respective segment for a roadway boundary. In this case, corresponding linear marking portions cannot be associated with the segments for the second roadway boundary. In this case, the segments of the second roadway boundary can only be checked for plausibility based on the at least one portion of the driving trajectory. Thereto, the respective distance difference values can preferably be used based on the linear portions or segments.

As was already explained in advance, an initial spacing can be ascertained in advance within the scope of this comparison, wherefrom the respective distance values for the corresponding segments or portions can be derived. These described comparisons can additionally be added to the described embodiment. Thus, the plausibility check can include these mentioned further comparisons. In this case too, it is preferably provided that the plausibility check is only effected if all of the criteria are satisfied. Thereto, the stripe angle is preferably less than the lane angle, the side distances of the respective portions of the driving trajectory to the respective marking portions of the roadway marking have to exceed a preset width value, the stripe distances are preferably lower than the respective lane distances and the distance difference values have to fall below either the coarse threshold value or the fine threshold value. Preferably, the plausibility check is only effected if all of these mentioned criteria are satisfied.

Thus, there are different cases how swarm data can be checked for plausibility with respect to sensor data of the sensing unit. Therein, different types of comparisons can be employed. Herein, it is to be noted that the described embodiments do not represent an exhaustive listing of possibilities with respect to the plausibility check. According to situation or traffic situation, additional criteria can be provided by way of further comparisons to even more reliably configure the plausibility check of the swarm data with respect to sensor data. The number of criteria or comparisons in particular also depends on the fact how many and which type of swarm data and sensor data, respectively, are present.

In particular, the method can be a computer-implemented method.

A further independent aspect of the disclosure can be a computer program comprising commands, which, upon execution of the program by a computer, cause it to execute the method according to the above mentioned aspect or an advantageous embodiment thereof. Similarly, a computer-readable storage medium can be provided as a further aspect, comprising commands, which, upon execution of the program by a computer, cause it to execute the method according to the above mentioned aspect or an advantageous embodiment thereof.

A second aspect of this disclosure relates to a method for operating a vehicle with a driver assistance system. Therein, the plausibility check according to the previously described embodiments is preferably employed. The operation of the vehicle can be combined with each embodiment with respect to the plausibility check. The method for operating the vehicle preferably resorts to the plausibility check and/or the method steps associated therewith. For operating the vehicle, an already effected plausibility check or determination that the swarm data could not be checked for plausibility, is in particular a starting point for the method for operating the vehicle. In all of the embodiments with respect to the plausibility check, it can preferably be ascertained how many portions of the driving trajectory, marking portions or other sections or subsets of the swarm data could be checked for plausibility.

In particular, in operating the vehicle, a number of portions checked for plausibility is sensed, wherein the portions checked for plausibility constitute a contiguous sequence. This preferably means that the number of portions checked for plausibility each immediately adjoin to each other. This in particular means that a portion does not exist between two portions checked for plausibility, which has not been checked for plausibility, thus is "not made plausible". For example, if five portions have been checked for plausibility, thus, these five portions constitute a contiguous sequence or series of portions. In this case, no single portion exists from the first to the fifth portion, which is not checked for plausibility. In this context, a check digit can for example be associated with each portion checked for plausibility in addition to the indexing. The check digit can for example be 1. In case of a failed or not effected plausibility check, a further check digit, for example 0, can be used. A sum of the check digits would indicate how many portions are checked for plausibility. However, a sum of the check digits would not yet give information if the number of portions checked for plausibility constitutes a contiguous sequence. The number of portions checked for plausibility, which constitute a contiguous sequence, can thus be lower than the number of portions checked for plausibility of the overall data.

In a further step, the number of portions checked for plausibility can be compared to a minimum value. The minimum value can for example be preset or be dependent on a speed of the vehicle. The minimum value can in particular be dependent on a spatial extension of the respective portions in direction of travel of the vehicle. In checking for plausibility or verifying the swarm data, it is reasonable to check this swarm data for plausibility along a certain minimum length in direction of travel starting from the vehicle. Herein, it can be important in particular that a continuous way in a direction of travel starting from the vehicle is checked for plausibility with respect to the swarm data. For this reason, the method preferably provides that the number of portions checked for plausibility constitutes a contiguous sequence. Preferably, the method for operating the vehicle provides that the plausibility check is considered as valid only if the number of portions checked for plausibility reaches or exceeds the minimum value.

Thus, the swarm data is preferably approved if the number reaches or exceeds the minimum value. Therein, the swarm data is in particular approved up to the number of the portions checked for plausibility. The approval of the swarm data in particular means that the swarm data, which is checked for plausibility, is approved for or provided to a driver assistance system, a control unit or another computing unit. The driver assistance system can for example be an assistance for a transverse guidance or a lane keeping assistant.

Alternatively, it can be provided that an indication signal for a driver is generated, wherein the indication signal in particular indicates that the driver assistance system is deactivated. This situation is preferably provided if the number of the portions checked for plausibility falls below the minimum value. Thus, the method for operating the vehicle provides a further criterion. In particular, it is checked whether or not the number of contiguous portions checked for plausibility falls below the minimum value. If the number of portions checked for plausibility reaches or exceeds the minimum value, thus, the swarm data can be approved and/or used for the driver assistance system. Otherwise, the indication signal is preferably output, which can indicate that a driver assistance system is temporarily not present. Alternatively, the indication signal can include as information that swarm data cannot be used and a functionality of the driver assistance system is restricted. In addition, it can also be provided that the indication signal is output if a plausibility check of the portions is successful and a full functionality of the driver assistance system is indicated. The indication signal can respectively be optically, haptically and/or acoustically formed. Thus, a driver can always be informed about a current state of the driver assistance system. Thus, it can be ensured that the plausibility check is reliable since the plausibility check is preferably only effected if a sufficient number of portions is checked for plausibility.

An additional or alternative embodiment with respect to the second aspect provides that the minimum value is determined depending on a speed of the vehicle and/or depending on a detected traffic situation. The traffic situation can for example be performed with the aid of a camera as well as an associated object recognition. The number of contiguous portions checked for plausibility preferably indicates to what extent the swarm data is checked for plausibility in vehicle direction. Therein, a rear axle of the vehicle can be selected as a reference point. The number of contiguous portions checked for plausibility can be interpreted as a plausibility value. The minimum value can be appropriately adapted. Tendentially, a higher minimum value is provided if the speed of the vehicle increases. In this case, it is reasonable to check a larger distance situated in front of the vehicle for plausibility with respect to the swarm data. Conversely, a lower distance, which is situated in front of the vehicle, can be checked for plausibility at lower speeds.

An additional or alternative embodiment of the second aspect can provide that the roadway is classified and/or a preset traffic situation is recognized by way of the sensing unit of the vehicle. The classification of the roadway as well as of the preset traffic situation can be effected with the aid of a camera, in particular front camera. Therein, a computing unit or a neural network can additionally analyze and/or evaluate the image data sensed by the camera. With the aid of corresponding image processing processes, preset traffic situations can be recognized based on one or more images. Therein, an object recognition can in particular be effected.

The threshold value, angle threshold value, lane angle and/or lane distance can each be defined depending on the classified roadway and/or traffic situation. Moreover, it can be possible to respectively define different threshold values and/or angle threshold values for multiple different traffic situations. Thus, the threshold values and angle threshold values can be flexibly adapted. With respect to the classification of the roadway, it can preferably be provided that it is recognized if a highway or a rural road is present as the roadway. In case of a recognized highway, other angle threshold values and threshold values can be provided than in case of a recognized rural road or a farm track. In certain traffic situations, a higher degree with respect to the reliability of the plausibility check can be required. For example, a particularly accurate lane recognition can be required in a tunnel entrance or passage. In this case, the corresponding angle threshold values and threshold values can be adapted, thus reduced. Thus, an own threshold value can respectively be assigned to a preset traffic situation.

A third aspect of the disclosure relates to a driver assistance system with a control unit. The control unit is preferably configured to operate the driver assistance system and/or to execute the embodiments with respect to the plausibility check. The driver assistance system can comprise a sensing unit for sensing information with respect to a roadway boundary. The sensing unit can be a camera, ultrasonic sensor, radar sensor and/or lidar sensor.

A fourth aspect of the disclosure relates to a vehicle with a driver assistance system. The vehicle can also comprise the control unit. The control unit can check the swarm data for plausibility by way of the information, which is sensed by the sensing unit, during a travel of the vehicle. In particular, a front camera is employed for sensing the roadway lane of the roadway boundary.

The vehicle or the driver assistance system preferably comprises the control unit. The control unit can comprise a processor device, which is configured to perform an embodiment of a method. Hereto, the processor device can comprise at least one microprocessor, at least one microcontroller, at least one FPGA (Field Programmable Gate Array), at least one DSP (Digital Signal Processor) and/or a neural network. Furthermore, the processor device can comprise a program code, which is configured to perform the embodiment of the method upon execution by the processor device. The program code can be stored in a data storage of the processor device. The control unit can include an internal or external storage unit. The external storage unit can be formed as a cloud unit.

The features, examples as well as the advantages thereof presented in context of the method for checking for plausibility according to the first aspect of the disclosure and of the method for operating the vehicle according to the second aspect of the disclosure and of the driver assistance system according to the third aspect of the disclosure correspondingly apply to the vehicle according to the fourth aspect of the disclosure and vice versa. Method features can be interpreted as device features as well as vice versa. All of the features with respect to the method for checking for plausibility and for operating the vehicle can be regarded as device features. Similarly, concrete device features of the vehicle and of the driver assistance system can be regarded as corresponding method features.

Below, embodiments of the disclosure are explained in more detail based on the attached drawings. Herein, it is to be noted that the drawings only demonstrate exemplary possibilities of realizing the disclosure. Similarly, the features mentioned in the different embodiments can also be employed or used in other features, even if it is not explicitly mentioned in the concerned embodiment.

DETAILED DESCRIPTION

Figure 1:
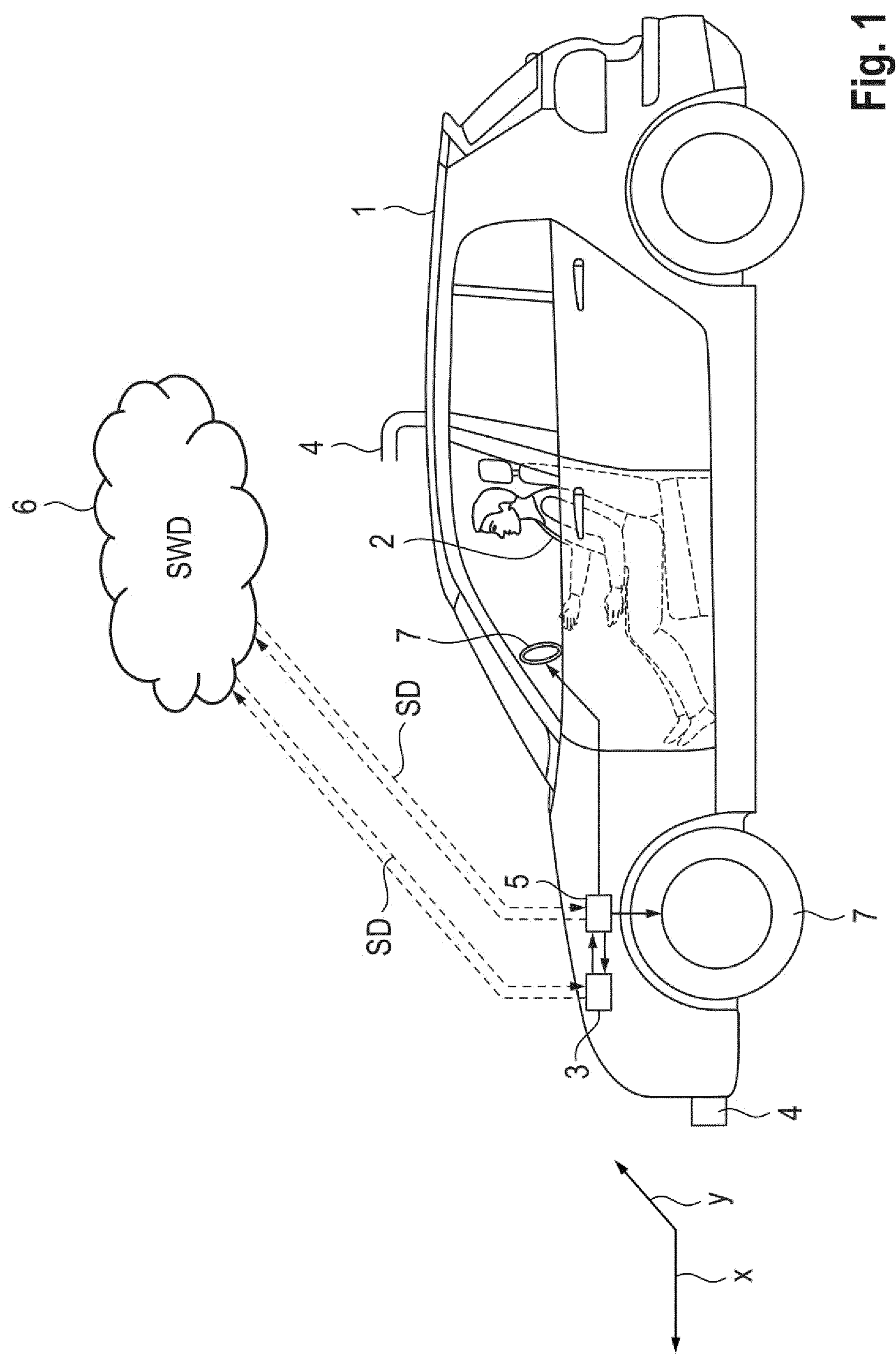
FIG. 1 shows an exemplary representation of a vehicle with a driver assistance system as well as an external storage unit.

In FIG. 1, a vehicle 1 is exemplarily shown. The vehicle 1 can be an automobile, motor vehicle, motorcycle, truck or car. A driver 2 is sitting in the vehicle 1. A steering wheel 7 is positioned in front of the driver 2. In case of FIG. 1, the vehicle 1 comprises two sensing units 4. The sensing units 4 are preferably formed as cameras. The sensing unit 4 arranged in the bumper area can alternatively be formed as an ultrasonic or radar sensor or lidar sensor. In FIG. 1, a direction of travel x of the vehicle 1 is indicated. A transverse direction y is indicated perpendicular to this direction of travel x. The motor vehicle 1 comprises a driver assistance system 3. The driver assistance system 3 can comprise a control unit 5 or be connected to the control unit 5. The driver assistance system 3 can establish a data link to an external storage unit 6. Information of the external storage unit 6 can be transferred to an internal storage of the vehicle 1, for example into an on-board network. So-called swarm data SWD can be obtained from the external storage unit 6 or the internal on-board network. Similarly, the control unit 5 and/or the driver assistance system 3 can transfer data to the external storage unit 6. It can for example be sensor data from the sensing units 4. By a data transfer or sensor data, which is recorded by the sensing units 4, the swarm data SWD in the external storage 6 can be extended or supplemented. In FIG. 1, a wheel 7 of the vehicle 1 is also indicted. Preferably, the driver assistance system 3 is formed as an assistance for a transverse guidance or transverse steering.

The assistance in the transverse guidance is to be helpful to the driver 2 in safely moving the vehicle 1 along a lane. In order to be able to even more reliably or efficiently satisfy this function, the driver assistance system 3 can make use of the information provided by the external storage unit 6 in the form of the swarm data SWD. The information provided by the external storage unit 6 can be interpreted as swarm data SWD, fleet data. The swarm data SWD in particular includes trajectories of other vehicles, which have already traveled along a route, on which the vehicle 1 is currently located. From these multiple trajectories of other vehicles, a roadway trajectory FT can be provided. The swarm data can be present in spline form. In this case, the control unit 5 can be configured to correspondingly condition the swarm data SWD. In particular, the control unit 5 can convert the swarm data SWD with respect to the roadway trajectory FT into respectively linear segments.

Figure 2:
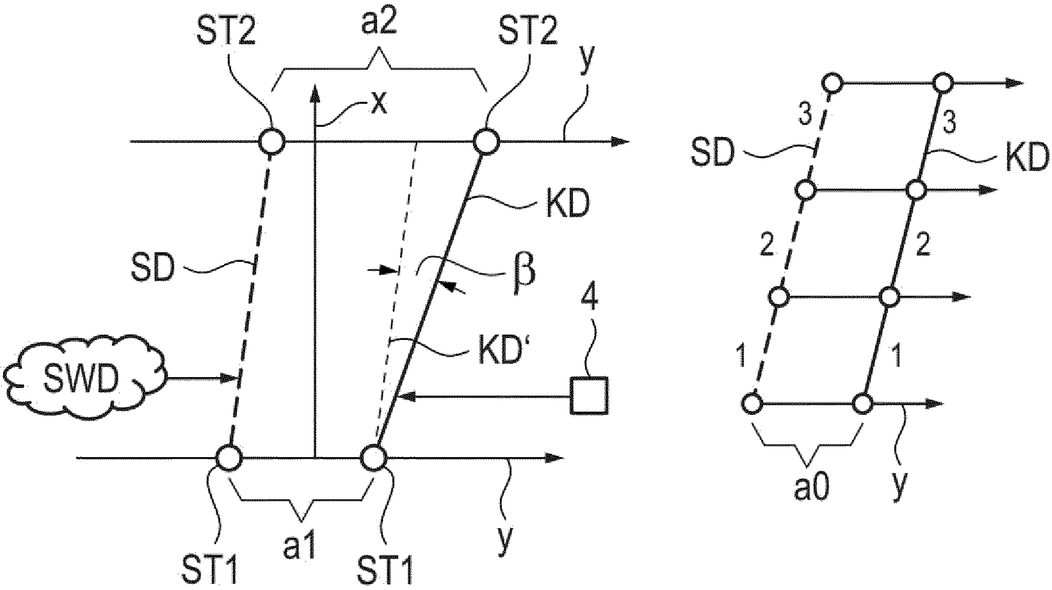
FIG. 2 shows a schematic representation of a plausibility check procedure.

In FIG. 2, a portion SD of the swarm data SWD as well as a segment KD of a roadway boundary for a roadway are exemplarily shown. Preferably, the swarm data SWD as well as the camera data KD of the camera 2 are linearized. This means that the control unit 5 can approximately approximate swarm data SWD in spline form by way of linear portions SD or partial segments KD. The swarm data SWD in FIG. 2 can relate to a first (left) roadway boundary SLB or second (right) roadway boundary SRB. The roadway boundary can be a roadway marking, a lane marking. A roadway boundary cannot only be a line or dashed line drawn on the roadway, but the roadway boundary can also be a change of the roadway property or an elevation of the roadway. For example, a curb can also represent a roadway boundary. A roadway boundary can also result in case of a shoulder, at which a property of the ground significantly changes. For example, if a meadow is arranged next to a tarred roadway, thus, this transition can be construed and detected as a roadway boundary. Such a roadway boundary can be contained in the swarm data SWD as information on the one hand as well as be detected by the sensing unit 4. In the FIGS. 2 to 4 and 11, it is respectively indicated that the segments KD of the roadway boundary SLB, SRB are sensed by the camera 4 and the portions SD to the driving trajectory FT are provided by the swarm data SWD.

The portion SD for the swarm data SWD as well as the segment KD for the camera data KD can each comprise two supporting points. Both the linear portion SD and the linear segment KD preferably comprise a first supporting point ST1 as well as a second supporting point ST2. By these two supporting points ST1, ST2, the concerned segment KD or portion SD is respectively defined. Preferably, the first supporting points ST1 are arranged or positioned along the transverse direction y. The same preferably applies to the second supporting points ST2. The segments KD and the portions SD can be subsumed by the terms "elements". Along the vehicle direction x, two elements arranged opposing in y-direction have the same spatial extension. Preferably, the respective first and second supporting points are arranged at the same level, thus have the same x-coordinate. Preferably, the swarm data SWD is addressed by the term portion, while the data of the sensing unit 4, in particular of the camera 4, is preferably addressed by way of the term segment. Both the swarm data SWD and the camera data KD can be addressed by the term "element". The camera data KD can be interpreted as sensor data. The term "segment" preferably relates to the sensor data (camera), while the term "section" or "portion" preferably addresses the swarm data SWD.

In the left area of FIG. 2, a first distance a1 and a second distance a2 are shown. These two distances represent a spacing between the two illustrated elements. Both distance values or an average value from these two distance values can be employed for checking for plausibility.

In checking for plausibility, two distance difference values are preferably formed from the two distance values a1 and a2. Thereto, an initial distance a0 is determined in advance. In the right area of FIG. 2, the initial distance a0 is exemplarily indicated. The initial distance a0 in particular results by a spacing or a distance of the two first supporting points ST1 of the first elements at the beginning of the plausibility check. In the right area of FIG. 2, digits 1, 2, 3 are represented on the right. These digits are to be understood as indexes with respect to the respective elements. Thus, the initial distance a0 represents the distance between the two first supporting points ST1 of the first segment KD to the first portion SD. The initial distance a0 preferably represents the (very) first distance between two first supporting points ST1, which is determined in an initiation of the method. The distance difference values can be ascertained by a subtraction of the respective two distance values with the initial distance. The thus ascertained distance difference values can be compared to respectively adapted threshold values.

As was already explained, the respective threshold value can be adapted according to situation. For example, the threshold value can be dependent on a speed of the vehicle 1. Similarly, the respective threshold value can be dependent on preset traffic situations. For example, if children are detected at the roadside, thus, a higher degree of plausibility check can be required. In this case, the respective threshold values can be even finer adjusted. Basically, the examples presented here provide two different threshold values. With the aid of a coarse threshold value, the swarm data SWD can be faster checked for plausibility.

If enough swarm data or enough sensor data KD from the camera 4 or the sensing unit 4 is present, thus, the first and/or second plausibility condition can be faster examined. With a slightly poorer information situation, it can be required to extremely thoroughly perform the plausibility check. In this case, the fine threshold value is used in the comparison. The finer threshold value is mostly less than the coarse threshold value.

On the left of the segment KD, FIG. 2 shows a line KD' associated with the segment. This line KD' associated with the segment KD is formed parallel to the portion SD of the swarm data SWD. An angle β can be ascertained between the line KD' and the segment KD. With the aid of the angle β, a deviation of a parallelism between the two elements can be determined. This can be examined by way of a second plausibility condition. Thereto, the angle β can be compared to an associated angle threshold value. Here too, a coarse as well as fine angle threshold value can be used. The explanations to the already mentioned coarse and fine threshold values correspondingly and analogously apply to the coarse and fine angle threshold values.

For the first plausibility condition, a distance or multiple distances a1, a2 of the at least one portion SD of the driving trajectory FT to the at least one segment KD of the roadway boundary can be compared to a threshold value and the angle β between the at least one portion SD of the driving trajectory FT and the at least one segment (KD) can be compared to an angle threshold value.

For the second plausibility condition, the stripe angle between the at least one segment KD and the at least one first marking portion ML can be compared to the lane angle γ and a stripe distance given by the at least one marking portion ML and the at least one segment KD of the roadway boundary SLB, SRB can be compared to the lane distance al1, al2.

A fine plausibility check can be performed as follows. Based on the two distance values a1 and aA2 as well as from the initial distance a0, the respective distance difference values are first determined. This can be effected with the aid of the following formulas.

$$ad1 = a1 - a0; \qquad \text{formula 1}$$

$$ad2 = a2 - a0; \qquad \text{formula 2}$$

These two distance difference values are respectively compared to the fine threshold value.

In a coarse plausibility check, the distance difference values ad1 and ad2 can be ascertained in the same manner. In contrast to the fine plausibility check, in the coarse plausibility check, the two distance difference values ad1, ad2 are compared to the coarse threshold value. If the comparison yields that the distance difference values ad1, ad2 do not exceed the respective threshold value, thus, fall below it, thus, the plausibility check can be continued. These comparison can represent one of multiple criteria, which have to be satisfied to allow a plausibility check. Preferably, it is additionally provided that the angle β also does not exceed the coarse angle threshold value or fine angle threshold value. Thus, both the coarse plausibility check and the fine plausibility check in particular respectively include one or more distance criteria, which can be based on two distance difference values and an angle criterion. Preferably, the plausibility check can only be effected and/or continued if both criteria are satisfied.

Figure 3:
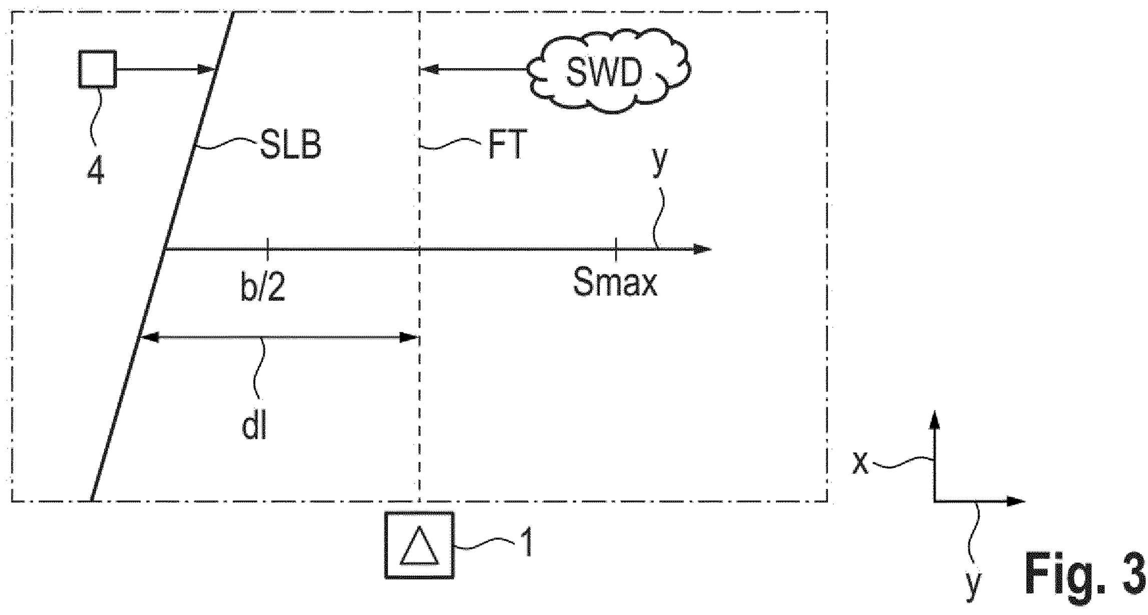
FIG. 3 shows a first example for a plausibility check of swarm data with the aid of sensor data.
Figure 4:
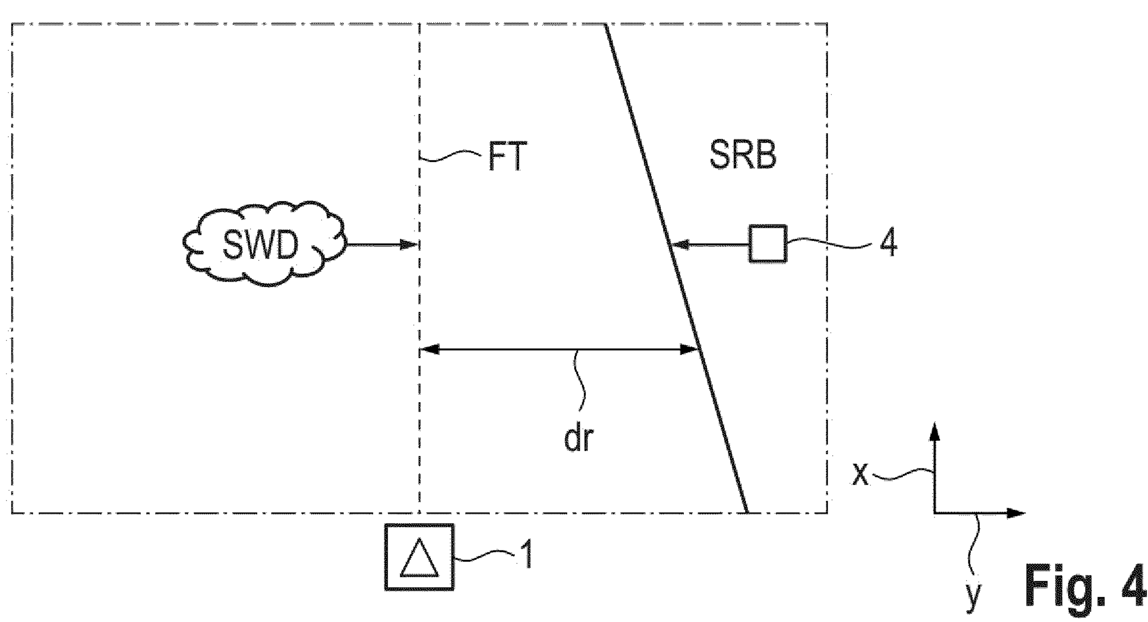
FIG. 4 shows a second example for a plausibility check of swarm data with the aid of sensor data.

In the FIGS. 3 and 4, information from the swarm data SWD and information from the sensing unit 4 are respectively present. The FIGS. 3 and 4 differ only in that sensor data relating to a left roadway boundary is present in case of FIG. 3 and sensor information KD relating to a right roadway boundary SRB is present in FIG. 4. In both embodiments, swarm data SWD with respect to the driving trajectory FT is present. In both figures, the vehicle 1 is respectively indicated, which moves in vehicle direction x. The vehicle 1 does not have to exactly move along the driving trajectory FT, it is sufficient if the vehicle is located only in a tolerance range around the driving trajectory FT.

In the examples according to FIG. 3 and FIG. 4, the information situation is to be categorized as slightly poor.

Based on the swarm data SWD, only a driving trajectory FT can be acquired, and with respect to roadway markings or roadway boundaries, only information for the left or right roadway boundary SLB, SRB on the part of the sensing unit 4 is respectively present. The roadway trajectory FT can be divided into multiple linear portions SD by the control unit 5. Similarly, the left roadway lane SLB can be divided into multiple linear segments KD. In FIG. 2, such a division or linearization is exemplarily indicated. The left roadway boundary SLB, the information of which originates from the sensing unit 4, and the portions SD of the driving trajectory FT can be examined with respect to a parallelism with the aid of the distance values a1 and a2 as well as by way of the distance difference values ad1 and ad2. However, the comparisons illustrated in FIG. 2 are preferably only a part of the plausibility check.

In case of the FIGS. 3 and 4, between the driving trajectory FT and the segments KD of the left roadway SLB or right roadway SRB, an associated side distance dl or dr can respectively be ascertained. The side distance dl, dr indicates a lateral offset of the respective portion SD of the driving trajectory FT to the respective segment KD of the roadway boundary SLB. Thereby, it can be examined to what extent the driving trajectory FT is away from the segments KD of the left roadway SLB on the right. Thus, the side distance dl can be determined. In analogous manner, the distance dr can be ascertained, which ascertains a spacing between the driving trajectory FT and the segments of the right roadway SRB. The distances dl and/or dr are in particular within a width interval [b/2; $s_{max}$]. In particular, a vehicle width in y-direction is addressed by "b", which can exemplarily be 2.2 meters. The width interval [b/2; $s_{max}$] can be defined based on a proportionate vehicle width and a lateral maximum value $s_{max}$. Preferably, a half vehicle width b/2 constitutes a lower value of the width interval, for example 1.1 meters. The upper value of the width interval can be preset based on a lateral maximum value $s_{max}$. The examination to what extent the side distances dl, dr are within the width interval [b/2; $s_{max}$], can be regarded as an extension of the first plausibility condition.

In FIG. 3, a y-axis is exemplarily indicated in the center. Two coordinates are plotted along this y-axis. The first coordinate is denoted by b/2, the second coordinate bears the name $s_{max}$. The maximum side distance $s_{max}$ can for example be a width of the lane of the vehicle 1. The examples shown in the FIGS. 3 and 4 are based on the comparisons explained in FIG. 2.

In the example of FIG. 3, further comparisons or criteria for the plausibility check are provided, which can be added in addition to the first plausibility condition. In addition, the examples according to FIGS. 3 and 4 provide that a lateral offset of the segments KD of the left roadway boundary SLB to the portions SD of the driving trajectory FT is examined. Thereto, the side distance dl between the driving trajectory FT and the segments KD of the left roadway boundary SLB can be determined. As a further condition, it can be examined if the side distance dl is within the interval [b/2; $s_{max}$]. Accordingly, the side distance dl is to be greater than the value b/2, but less than the maximum side distance $s_{max}$.

Thus, the situations shown in the FIGS. 3 and 4 preferably require a further additional criterion for the plausibility check besides the criteria shown in FIG. 2. On the one hand, the portions of the driving trajectory FT are compared or checked for plausibility with respect to the segments of the left roadway boundary SLB according to the explanations in FIG. 2 as well as the previously mentioned explanations. However, it is to be noted that the plausibility check is thereby not yet completely finished. In the examples of the FIGS. 3 and 4, it is additionally examined to what extent the portions SD of the driving trajectory FT are apart from the segments KD of the left or right roadway boundary. Thereto, the side distances dl or dr are preferably ascertained. Furthermore, it is examined if they are within the width interval [b/2; $s_{max}$]. Preferably, the plausibility check is only effected if this condition is also additionally satisfied in the examples of the FIGS. 3 and 4. If a sole condition from FIG. 2 or FIG. 3 is not satisfied, thus, a corresponding indication signal can be provided to the driver 2. In this case, it can be indicated that the driver assistance system 3 does not operate or is activated only to restricted extent. The explanations to FIG. 3 can be correspondingly and analogously transferred to FIG. 4. In FIG. 4, the segments for the second roadway marking SRB are positioned to the right of the driving trajectory FT. Accordingly, the distance dr is ascertained instead of the distance dl.

Figure 5:
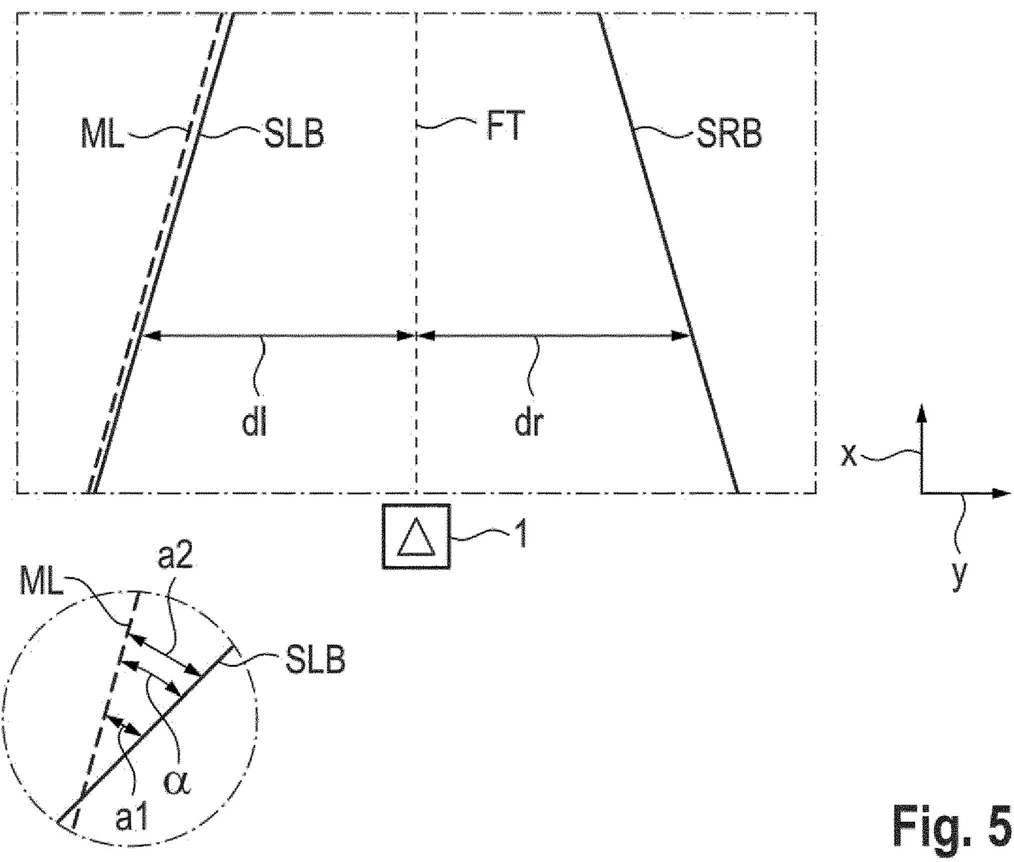
FIG. 5 shows a third example for a plausibility check of swarm data with the aid of sensor data.
Figure 6:
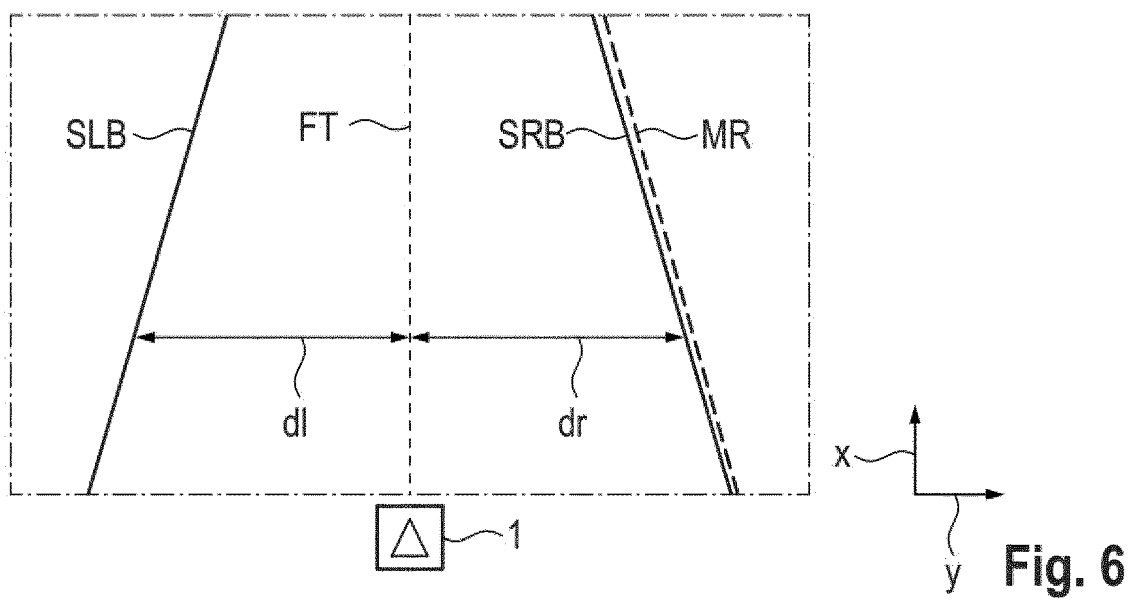
FIG. 6 shows a fourth example for a plausibility check of swarm data with the aid of sensor data.

In the embodiments according to FIGS. 5 and 6, information relating to segments KD of the first roadway boundary SLB as well as information relating to segments KD of the right roadway boundary SRB can be provided from the sensing unit 4. The first roadway boundary SLB is formed as a left roadway boundary SLB in FIGS. 5 and 6, while the second roadway boundary SRB is formed as a right roadway boundary. Thus, in the example of FIG. 5, information with respect to two different roadway boundaries is present. From the swarm data SWD, the driving trajectory FT as well as information relating to multiple first linear marking portions ML can be acquired. ML represents multiple linear marking portions for a left roadway boundary or lane marking. Information relating to the marking portions ML as well as the driving trajectory FT can be provided by the external storage unit 6 in the form of the swarm data SWD. Alternatively, the control unit 5 can obtain raw data in the form of splines from the external storage unit 6 and correspondingly retransform and condition this raw data. The segments KD of the left roadway boundary SLB can be examined with the portions SD of the driving trajectory FT according to the explanations of FIG. 2. In this examination, the second plausibility condition is preferably employed. Therein, the coarse threshold value can be used. Since besides the segments KD to the left roadway boundary SLB, further associated swarm data SWD in the form of the left marking portion ML is present, the segments of the left roadway boundary SLB can be additionally examined with the marking portion ML for the left roadway marking. Therefore, the coarse threshold value is sufficient in the examination of the left roadway boundary.

In case of FIG. 5, the driving trajectory FT can additionally be checked for plausibility with the aid of the segments KD of the right roadway boundary SRB. This check can be effected according to the explanations to FIG. 2, wherein the fine threshold value is used. This is in particular because swarm data SWD is not present for the right roadway boundary in the example of FIG. 5. The side distances dl and dr of the driving trajectory FT to the segments KD of the left roadway boundary and the segments of the right roadway boundary SRB can be ascertained as was previously explained. According to the example of FIG. 5, it can preferably be examined if the side distances dl and dr are within the width interval [b/2; $s_{mx}$]. Therein, the width interval [b/2; $s_{max}$] illustrated in FIG. 3 can be used.

In case of FIG. 5, a further criterion can be additionally provided for the second plausibility condition. This further criterion considers the left linear marking portions ML compared to the segments KD of the left roadway boundary SLB. In this case, a lane boundary or roadway marking in itself is preferably analyzed without incorporating the driving trajectory FT. Basically, the correlation of the left marking portions ML with the segments KD to the left roadway boundary SLB can be effected analogously according to the explanations to FIG. 2. However, in contrast to FIG. 2, different threshold values are used for the distance and the angle in this case. Here, the first and second distance values are in particular each referred to as “stripe distance”. Similarly, the angles can be referred to as “stripe angles”. The stripe distance or the multiple stripe distances should preferably be lower than a lane distance al1, al2 and the stripe angle preferably is to be lower than a lane angle γ.

In FIG. 5, an encircled area is represented in enlarged manner. Here, the second plausibility condition can be illustrated. The left marking portions ML form the angle γ with the segments KD to the left roadway boundary SLB. The angle γ is to be understood as the lane angle. The first stripe distance value all and the second stripe distance value al2 can be analogously ascertained between the lines ML and SLB according to the explanations to FIG. 2. Based on this examination, it can be determined to what extent the left marking portions ML can be associated with the segments KD to the left roadway boundary SLB. The left marking portions can be construed as respective portions SD to the left roadway boundary SLB.

This examination can be construed as an additional criterion for the second plausibility condition, which is in particular provided to be able to complete the plausibility check in the example of FIG. 5. To put it simply, the example in FIG. 5 represents an improved plausibility check compared to the example in FIG. 3 or 4.

Since additional camera data KD or additional swarm data SD is present in case of FIG. 5, additional comparisons can be correspondingly performed to more reliably configure the plausibility check. In FIG. 5, the same criteria as in FIGS. 3 and 4 are preferably valid, wherein two further additional criteria can be added in FIG. 5, to be able to successfully complete the plausibility check. In the example of FIG. 5, the portions SD of the driving trajectory FT can be correlated with the segments KD to the right roadway boundary SRB (first additional criterion) and the left marking portions ML can moreover be correlated and checked for plausibility with the segments KD to the left roadway boundary SLB as explained (second additional criterion). These two criteria can modify or extend the first plausibility condition in the example of FIG. 5 and additionally be added for the plausibility check compared to the examples in FIGS. 3 and 4.

The example in FIG. 6 is very similar to the example in FIG. 5. The sole difference in FIG. 6 to FIG. 5 is in that marking portions to the left roadway ML are not present, but marking portions to the right roadway MR. However, the plausibility check is preferably effected analogously as it was explained in the embodiment to FIG. 5.

Figure 7:
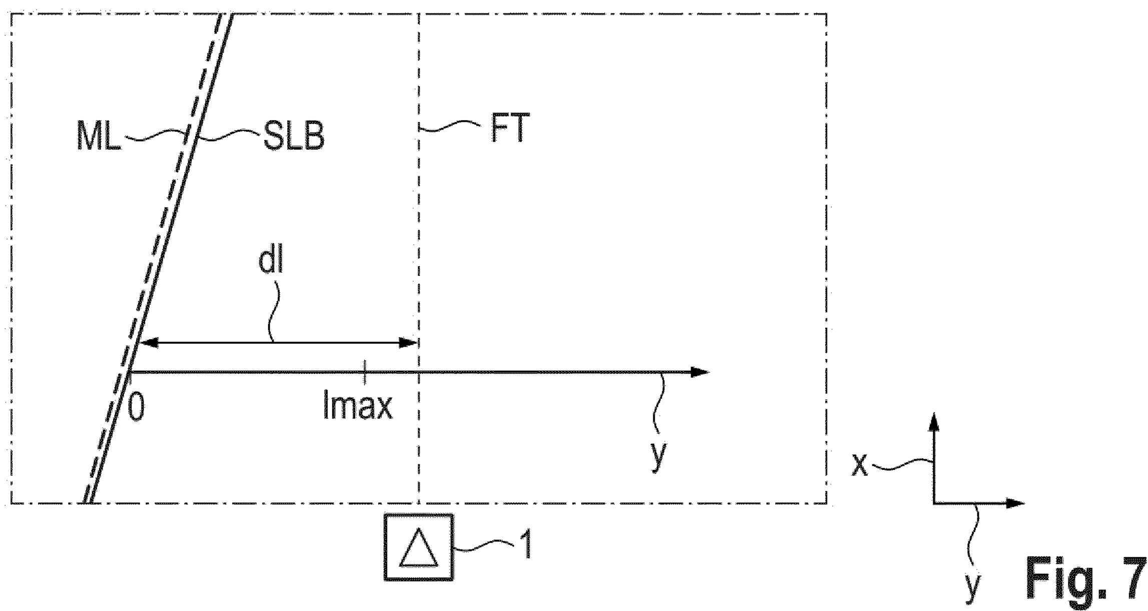
FIG. 7 shows a fifth example for a plausibility check of swarm data with the aid of sensor data.
Figure 8:
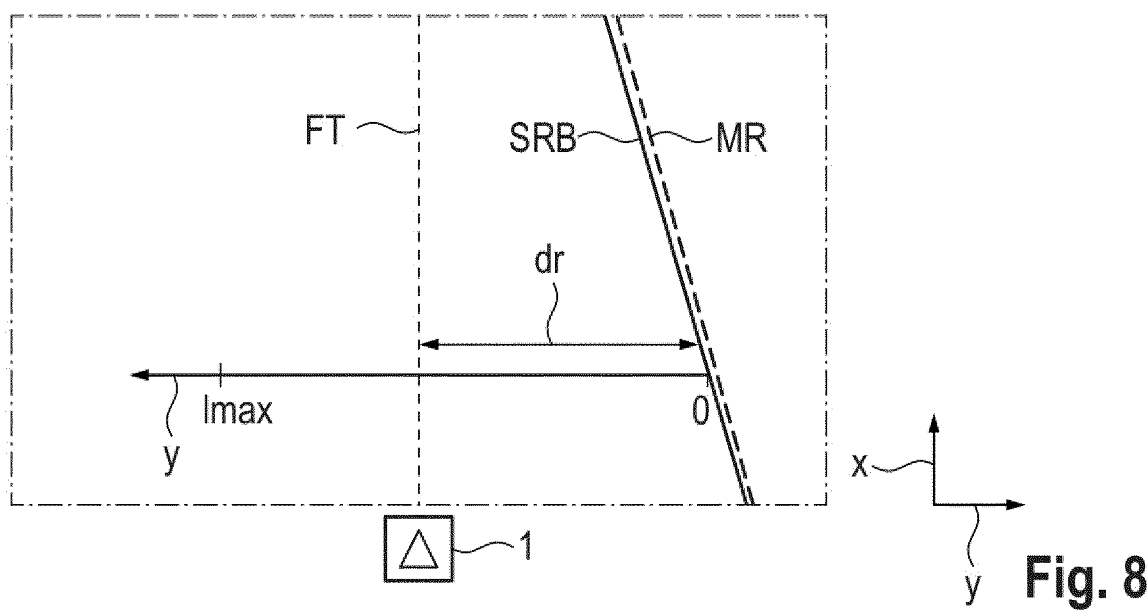
FIG. 8 shows a sixth example for a plausibility check of swarm data with the aid of sensor data.

In the FIGS. 7 and 8, only information relating to a single roadway boundary is present on the part of the sensing unit 4. In the example of FIG. 7, the segments KD to the left roadway boundary SLB can be correlated the linear marking elements ML to the left roadway similarly as it is explained in the embodiments to FIG. 5, 6 and FIG. 2. In the example of FIGS. 7 and 8 too, the left side distance dl and the right side distance dr of the driving trajectory FT to the respective linear segments KD, respectively, are preferably ascertained. These side distances dl, dr are preferably to be within the width interval [b/2; $s_{max}$]. Hereto, reference is additionally made to the explanations in FIG. 3. In the example of FIG. 7, the left side distance dl is preferably also ascertained. The left side distance dl indicates a distance from the driving trajectory FT to the left roadway boundary SLB.

Basically, it applies to all of the embodiments and execution examples that the comparison and plausibility check are preferably each effected in sections or in segments. Preferably, the comparison is performed for each individual segment KD of the left roadway boundary SLB as well as for each portion of the driving trajectory FT. In comparing the portions SD of the driving trajectory FT with respect to the segments KD of the left roadway boundary SLB (first plausibility condition), the coarse threshold value or the fine threshold value can be employed depending on situation. A decision, which one of these two threshold values is used, in particular depends on the left side distance. If the left lateral distance dl exceeds a lateral limit value $l_{max}$, thus, the fine threshold value is preferably used in comparing the portions SD of the driving trajectory FT with respect to the segments KD of the left roadway boundary SLB.

In the example of FIG. 7, the left lateral distance dl is greater than the lateral limit value $l_{max}$. In this case, the fine threshold value is employed in comparing the driving trajectory FT to the segments of the left roadway boundary SLB. In contrast, in FIG. 8, the right lateral distance dr is less than the lateral limit value $l_{max}$. In the case of FIG. 8, the coarse threshold value would be sufficient in the corresponding comparisons. The embodiments of the FIGS. 7 and 8 thus include three further criteria, which preferably all have to be satisfied to successfully complete the plausibility check.

A first condition implies that the portions SD of the driving trajectory FT extend parallel with respect to the segments to the left or right roadway boundary SLB, SRB within the scope of the respective threshold values. This examination can be associated with the first plausibility condition and be effected with the aid of the explanations to FIG. 2. Therein, it is to be noted that the comparison has to be effected for each individual portion SD and each individual segment KD, respectively. The left side distance dl and the right side distance dr, respectively, have to be within the width interval [b/2; $s_{max}$]. This can be understood as a second criterion. As a third criterion, the correlation of the respective marking portions ML, MR with respect to the respective segments KD to the left or right roadway boundary SLB, SRB can be construed as a third criterion. This third criterion can be construed as an extension of the second plausibility condition. With respect to the third criterion, reference is additionally made to FIG. 5, in particular the enlarged representation in FIG. 5. The embodiments according to the FIGS. 7 and 8 can preferably only be checked for plausibility if these three criteria or conditions are satisfied at the same time.

Figure 9:
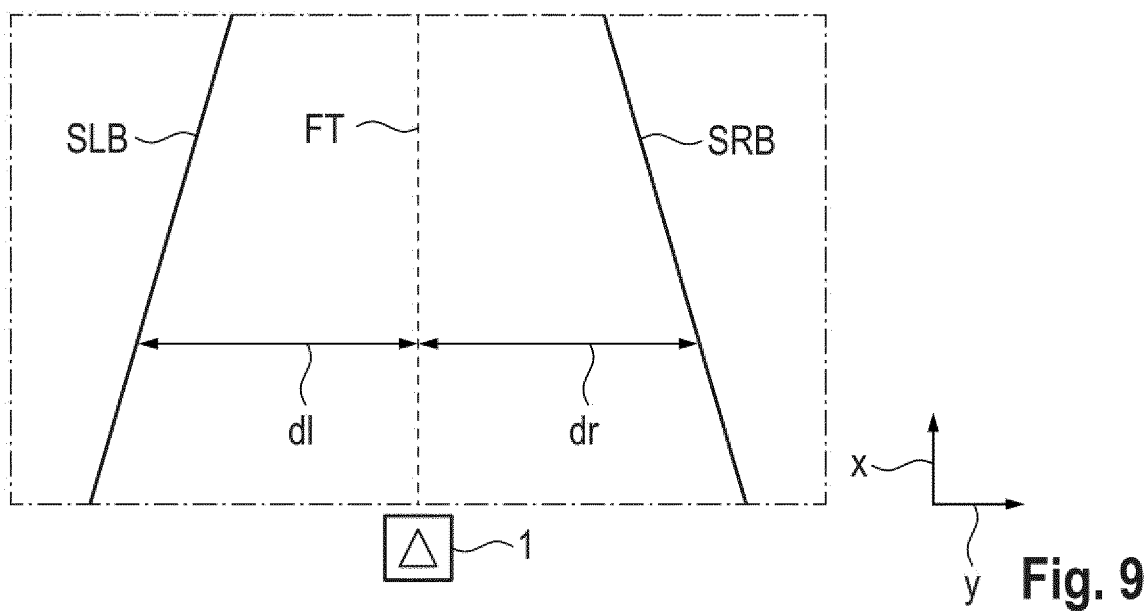
FIG. 9 shows a seventh example for a plausibility check of swarm data with the aid of sensor data.

In the example of FIG. 9, information relating to the left and right lane is provided by the sensing unit 4. Thus, segments KD to the left roadway boundary SLB and information relating to segments of the right roadway boundary SRB can be acquired as well as conditioned. On the part of the swarm data SD, information relating to the driving trajectory FT can be acquired. This information can be linearly conditioned as is explained in FIG. 2. In the example of FIG. 9, three criteria for the plausibility check are preferably to be satisfied. The portions SD of the driving trajectory FT can be compared with respect to the segments KD of the right roadway boundary SRB. Therein, it can be resorted to the method described in FIG. 2. In the example of FIG. 9, the fine threshold value is preferably employed. Alternatively, the multiple portions SD to the driving trajectory FT can be correlated with respect to the segments to the left roadway boundary SLB. In this case too, the fine threshold value is employed. The side distances dl and dr are to have at least the half vehicle width b/2 in the case of FIG. 9. According to the example of FIG. 9, the plausibility check is preferably only considered to be effected if these three mentioned criteria are satisfied at the same time.

Figure 10:
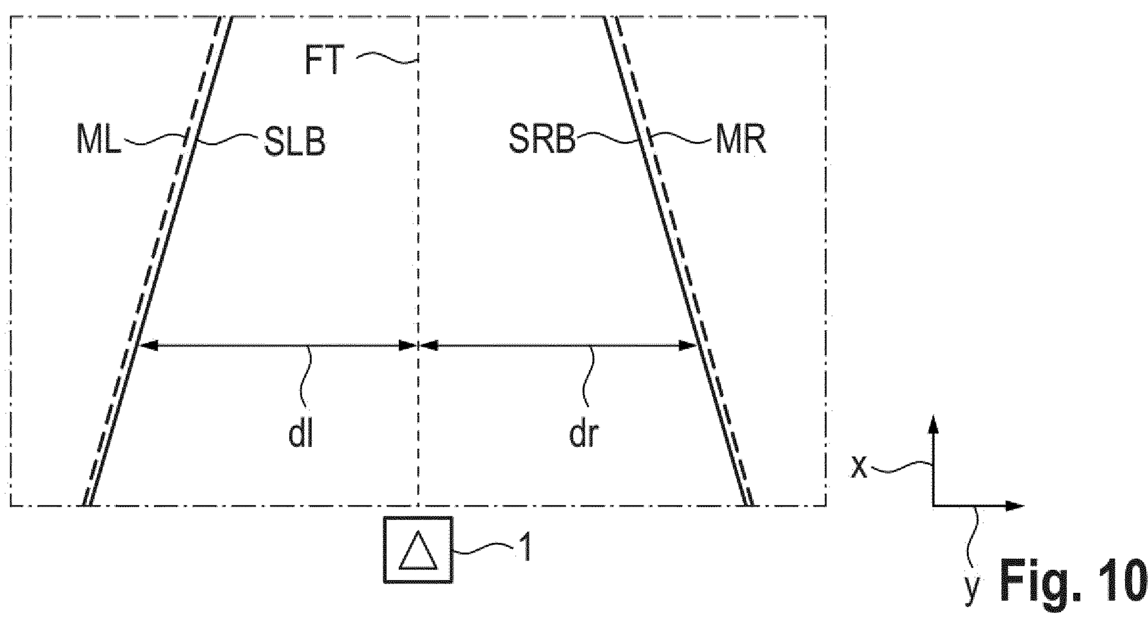
FIG. 10 shows an eighth example for a plausibility check of swarm data with the aid of sensor data.

In the example of FIG. 10, swarm data SWD with respect to the left roadway marking SLB, the right roadway marking SRB as well as the driving trajectory FT is present. In addition, information relating to the segments KD to the left roadway boundary SLB and the right roadway boundary SRB can be acquired by way of the sensing unit 4. In contrasting of the portions SD of the driving trajectory FT with respect to the segments KD to the right or left roadway boundary SRB, SLB, it is in particular resorted to the coarse threshold value in the example of FIG. 10. Hereto, reference is additionally made to the explanations to FIG. 2. The left side distance dl and the right side distance dr are in particular each at least a half vehicle width b/2 for a successful plausibility check. This would be the second criterion in case of FIG. 10.

Moreover, a correlation of the segments KD to the left roadway boundary SLB with respect to the left marking portions ML as well as the segments KD to the right roadway boundary SRB with the right marking portions MR can be effected as the third criterion. In this contrasting, the lane angle $\gamma$ or lane distance al1 and/or al2 are preferably taken as a basis as the comparison criterion. It is additionally made reference to the explanations of FIG. 5 as well as FIG. 2.

Compared to FIG. 9, the fine threshold value is used instead of the coarse threshold value. Since swarm data SWD with respect to both marking portions ML, MR is present in the example of FIG. 10, a corresponding correlation with the associated segments KD of the left or right roadway boundary can be correspondingly performed for both marking portions on the left and right side. Since the embodiment according to FIG. 10 provides most sensor data KD or swarm data SWD, further comparisons can be provided hereto to allow the plausibility check. On the one hand, the left and right marking portions can be correlated with the respective sensor data KD. The left side distance dl as well as the right side distance dr are preferably greater than the half vehicle width b/2. The portions SD of the driving trajectory FT can be correlated with respect to both segments KD to the right or left roadway boundary SLB and/or SRB.

Figure 11:
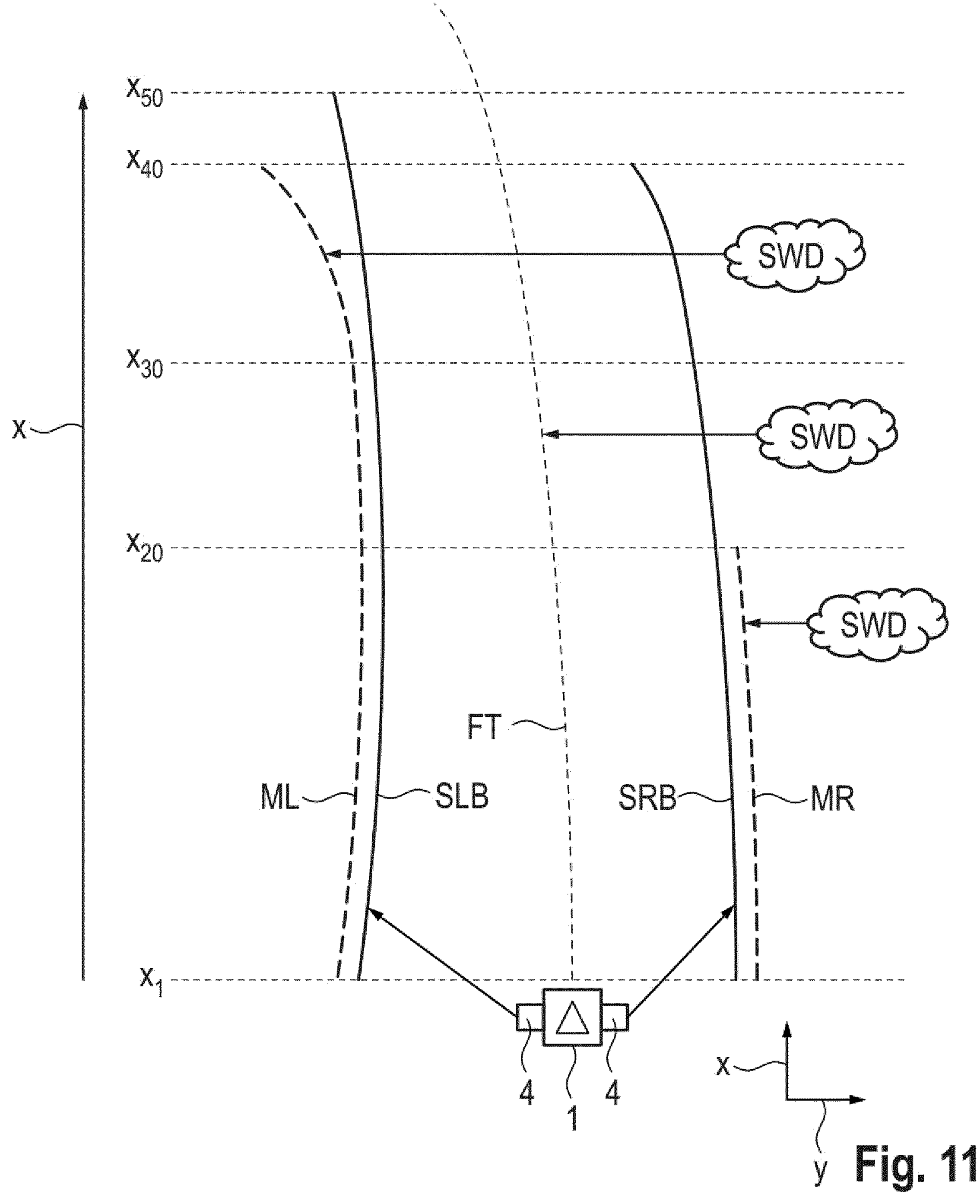
FIG. 11 shows a schematic overview of multiple embodiments.

In FIG. 11, multiple different embodiments are illustrated in combined manner. Immediately in front of the vehicle 1, a dashed line with the designation x1 is indicated. This line represents a position of the first portions SD of the driving trajectory FT or the first segments KD or portions SD of the left roadway marking ML and further elements. In x-direction, further segments KD or portions SD adjoin. For example, the dashed line x20 indicates that the twentieth portion SD or the twentieth segment KD respectively begins there. At the dashed line x30, the thirtieth segment or the thirtieth portion begins, at x40 respectively the fortieth portion or the fortieth segment.

Between the first and the twentieth segment, information relating to the lines ML, FT as well as MR is present on the part of the swarm data SWD. The camera data KD provides information relating to the roadway boundaries SLB and SRB. Since most information is present between the first segment and the twentieth segment compared to the following segments, it can be resorted to the embodiment of FIG. 10. In this case, the coarse threshold value can respectively be used with respect to the comparison of the portions SD to the driving trajectory FT with respect to the segments to the left or right roadway boundary SLB or SRB.

The coarse threshold value can be in the range between 30 and 40 cm. The fine threshold value can be in a range between 10 and 20 cm. The coarse angle threshold value can be between 4 and 5 degrees, while the fine angle threshold value can be between 1 and 2 degrees.

Since more information is present between the first and the twentieth segment compared to the following segments, it can be resorted to the coarse threshold value. Thus, it can be ensured that the plausibility check does not fail because the plausibility check fails due to an individual comparison due to too many criteria or too many comparisons. However, only information relating to the driving trajectory FT as well as to the left roadway boundary SLB is present between the fortieth and fiftieth portion or segment. In this case, it is preferably resorted to the fine threshold value in the comparison.

From the thirtieth portion at the left roadway marking ML, a drift to the left is indicated. This means that the left marking portions ML do not extend parallel along the segments to the left roadway boundary SLB anymore. Upon a corresponding comparison of these two lines according to the explanations to FIG. 2, the respective threshold value would be exceeded, thus a criterion would not be satisfied. For example, the lane angle or the lane distance would be exceeded in checking for plausibility. This would not allow the plausibility check. In this case, the swarm data SWD would not be approved for the control unit 5. An indication signal about the failed plausibility check can be provided to the driver 2. Therefore, in the example of FIG. 11, the plausibility check can only be effected up to the thirtieth portion or the thirtieth segment. The two crosses above the dashed line to the thirtieth segment indicate that a plausibility check is no longer possible from here.

This means that 30 portions or 30 segments can be continuously checked for plausibility starting from the vehicle 1 in the case of FIG. 11. Preferably, a further comparison with respect to a minimum value can now be effected. The minimum value in particular indicates how many segments or portions have to be checked for plausibility immediately one after the other to finally complete or evaluate the plausibility check. In particular, the minimum value can be dependent on a length of the portion or the segment in x-direction as well as on a speed of the vehicle 1. Thus, it can be ensured that a distance ahead of the vehicle 1 is checked for plausibility up to a minimum distance. In the case of FIG. 11, it is to be assumed that 30 elements SD, KD checked for plausibility one after the other are sufficient to successfully complete the plausibility check. In contrast, if it could only be continuously checked for plausibility up to the fifth element, thus, approval of the swarm data SWD for the driver assistance system 3 and/or the control unit 5 can be denied despite of the five elements checked for plausibility. Preferably, it is provided that only in case of a finally validly evaluated plausibility check, the swarm data SWD is approved for the driver assistance system 3 and/or the control unit 5. Of course, this preferably only applies to the elements checked for plausibility. Thereby, it can be ensured that the swarm data SWD is checked for its credibility over a certain minimum distance, which is in front of the vehicle 1 in direction of travel x.

The situation shown in FIG. 11 is also to be dynamically understood. This means that the first segment is respectively arranged immediately in front of the moving vehicle 1. Correspondingly, the remaining segments can dynamically move in direction of travel x. Preferably, the minimum value on elements checked for plausibility can be linked to a minimum distance or be converted into the minimum distance. In the case of FIG. 11, it is to be assumed in simplified manner that each segment is exactly one meter long along the direction of travel X. If the minimum value would be 20 and up to 30 elements in front of the vehicle 1 can be checked for plausibility in x-direction, thus, the plausibility check can be regarded as valid. Due to the minimum value, an anticipatory plausibility check of the swarm data of 20 meters is requested, while the method for checking the plausibility yields that the swarm data SWD can be checked for plausibility 30 meters in front of the vehicle 1. This situation corresponds to a successful plausibility check.

However, if only the first 5 elements would be able to be checked for plausibility in the method for checking for plausibility, thus, the minimum value or the minimum distance would not be reached, which is required to successfully complete the plausibility check. In this situation, the swarm data SWD provided by the external storage unit 6 would not be communicated or provided to the control unit 5 or the driver assistance system 3. In such a situation, an indication signal is preferably output for the driver 2. Here, the driver 2 can be informed that the driver assistance system 3 operates in restricted manner only based on the data of the sensing unit 4 or a corresponding function of the driver assistance system 3 is not available.

Overall, the disclosure with all its embodiments and examples shows how external information of the storage unit 6 can be examined for its credibility. Thereby, the advantage can arise that the sensing unit 4 or a corresponding sensor technology of the vehicle 1 can turn out slightly more concise or inexpensive.

Inconvenient or expensive sensor technology or computing operations can be outsourced from the vehicle 1 to an external backend or an external control unit. Thus, functions for the driver assistance systems 3 can nevertheless be offered without therein being dependent on complex or expensive sensor technology.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for checking plausibility of at least one portion of a driving trajectory for a vehicle, the method comprising:

providing the at least one portion of the driving trajectory and at least one first marking portion of a lane marking, roadway marking, and/or roadway boundary marking based on swarm data stored by a storage unit;

sensing at least one segment of a roadway boundary for a roadway of the vehicle by way of a sensing unit of the vehicle in operating the vehicle;

comparing the at least one portion of the driving trajectory to the at least one segment of the roadway boundary based on a first plausibility condition;

comparing the at least one first marking portion to the at least one segment of the roadway boundary based on a second plausibility condition; and checking the at least one portion for plausibility based on the comparing of the first plausibility condition and the second plausibility condition;

for the first plausibility condition, examining if a side distance of the at least one portion of the driving trajectory to the at least one segment of the roadway boundary is within a width interval, wherein the checking of the at least one portion for plausibility is based on the examining and the comparing;

sensing a number of portions checked for plausibility, wherein the portions checked for plausibility constitute a contiguous sequence;

comparing the number of portions checked for plausibility to a minimum value;

determining that the number of portions checked for plausibility is less than the minimum value;

generating an indication signal indicating that a driver assistance system is deactivated; and outputting the indication signal indicating that the driver assistance system is deactivated, wherein the indication signal is output optically, haptically, or acoustically.

2. The method according to claim 1, further comprising:

for the first plausibility condition, comparing one distance or more distances of the at least one portion of the driving trajectory to the at least one segment of the roadway boundary are compared to a threshold value and an angle between the at least one portion of the driving trajectory and the at least one segment to an angle threshold value, and/or for the second plausibility condition, comparing a stripe angle between the at least one segment and the at least one first marking portion to a lane angle, and comparing a stripe distance given by the at least one first marking portion and the at least one segment of the roadway boundary to a lane distance.

3. The method according to claim 1, wherein multiple portions of the driving trajectory as well as of the first marking portion, and multiple segments are respectively provided and each segment is associated with that portion for the comparing, which is positioned along a transverse direction of the vehicle starting from a respective segment.

4. The method according to claim 3, wherein the segments and portions of the driving trajectory are each defined based on a first supporting point and a second supporting point, respectively associated segments and portions have a same extension along a preset vehicle direction and two distance values based on the first supporting point and the second supporting point respectively associated in transverse direction are respectively used for the comparing for the first plausibility condition and/or the second plausibility condition.

5. The method according to claim 1, wherein at least one first linear marking portion and a second linear marking portion are respectively provided for a lane marking, roadway marking, and/or roadway boundary marking by the swarm data, the method further comprises:

sensing at least one segment for a first roadway boundary and a second roadway boundary for the roadway of the vehicle by way of the sensing unit; and for the first plausibility condition, examining if a first side distance of the at least one portion of the driving trajectory to the at least one segment of the first roadway boundary and a second side distance of the at least one portion of the driving trajectory to the at least one segment of the second roadway boundary each exceed a preset width value, and the checking of the at least one portion for plausibility is additionally effected depending on the examining and the comparing.

6. The method according to claim 1, wherein the minimum value is determined based on a speed of the Vehicle.

7. The method according to claim 1, further comprising: classifying the roadway and/or recognizing a preset traffic situation by way of the sensing unit of the vehicle, and a threshold value, angle threshold value, lane angle, and/or lane distance are defined based on the roadway and/or the preset traffic situation.

8. A driver assistance system, comprising:

A processor; and a storage device storing program code that, when executed by the processor, causes the driver assistance system to:

provide at least one portion of a driving trajectory and at least one first marking portion of a lane marking, roadway marking, and/or roadway boundary marking based on swarm data stored by a storage unit;

sense at least one segment of a roadway boundary for a roadway of a vehicle by way of a sensing unit of the vehicle in operating the vehicle;

compare the at least one portion of the driving trajectory to the at least one segment of the roadway boundary based on a first plausibility condition;

compare the at least one first marking portion to the at least one segment of the roadway boundary based on a second plausibility condition;

check the at least one portion for plausibility based on a result of comparing the first plausibility condition to the at least one segment of the roadway boundary and a result of comparing the second plausibility condition to the at least one segment of the roadway boundary;

for the first plausibility condition, examine if a side distance of the at least one portion of the driving trajectory to the at least one segment of the roadway boundary is within a width interval, wherein checking of the at least one portion for plausibility is based on examining if the side distance of the at least one portion of the driving trajectory to the at least one segment of the roadway boundary is within the width interval, comparing the at least one portion of the driving trajectory to the at least one segment of the roadway boundary based on the first plausibility condition, and comparing the at least one first marking portion to the at least one segment of the roadway boundary based on the second plausibility condition;

sense a number of portions checked for plausibility, wherein the portions checked for plausibility constitute a contiguous sequence;

compare the number of portions checked for plausibility to a minimum value;

determine that the number of portions checked for plausibility is less than the minimum value generate an indication signal indicating that the driver assistance system is deactivated; and output the indication signal indicating that the driver assistance system is deactivated, wherein the indication signal is output optically, haptically, or acoustically.

* * * * *